Nov. 16, 1926. 1,607,110
R. E. WING
SUPPORTING DEVICE FOR VEHICLE ATTACHMENTS
Filed Nov. 9, 1925 2 Sheets-Sheet 1
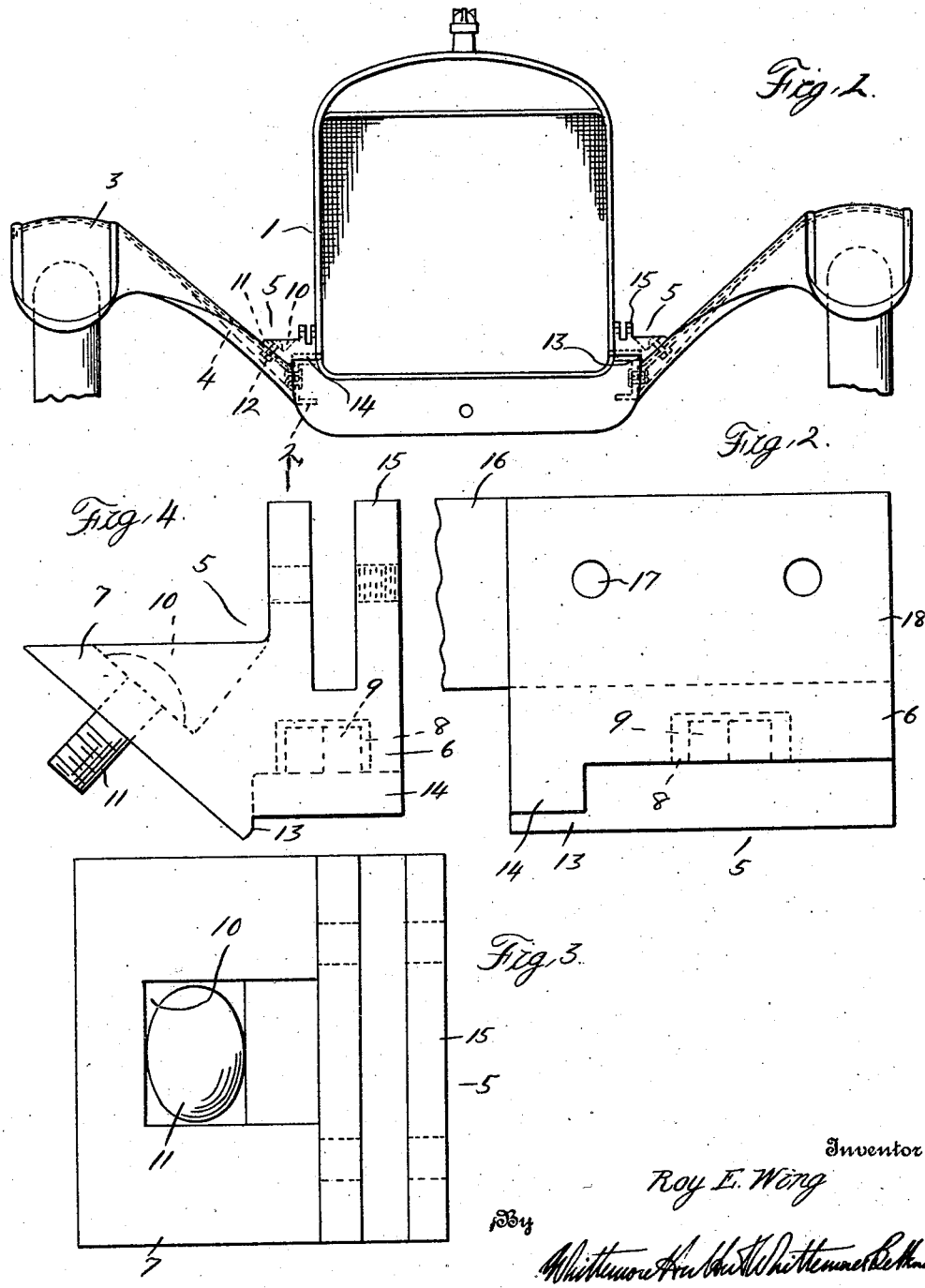

Nov. 16, 1926.
R. E. WING
1,607,110
SUPPORTING DEVICE FOR VEHICLE ATTACHMENTS
Filed Nov. 9, 1925   2 Sheets-Sheet 2
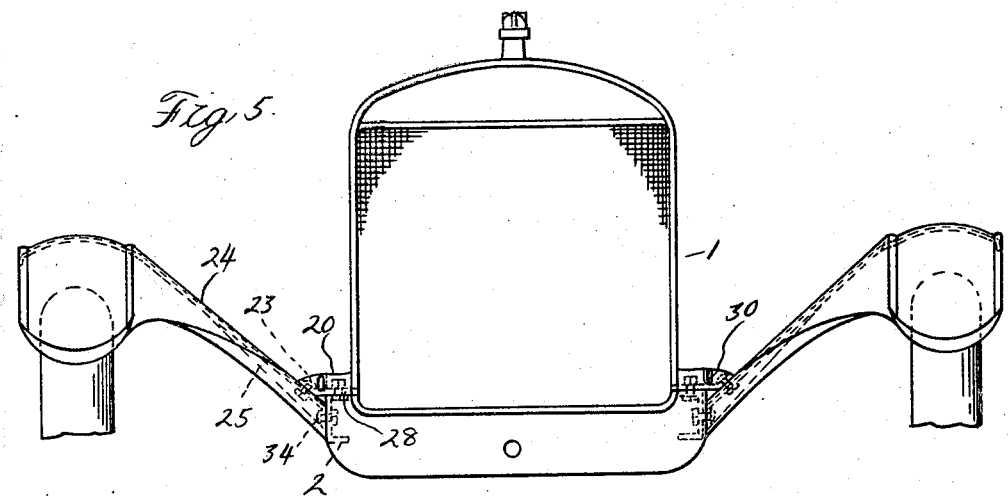
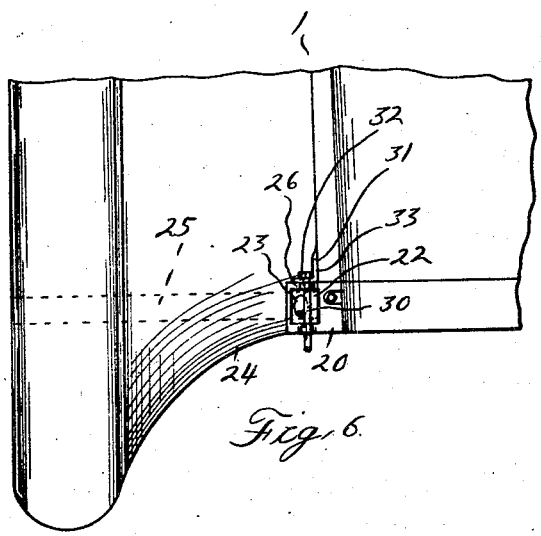
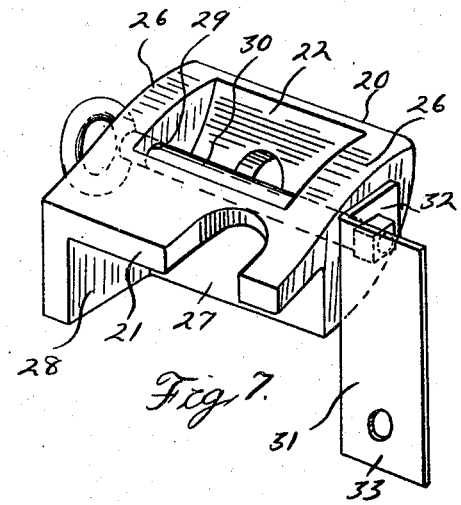
Inventor
Roy E. Wing.

Patented Nov. 16, 1926.

1,607,110

UNITED STATES PATENT OFFICE.

ROY E. WING, OF DETROIT, MICHIGAN, ASSIGNOR TO JAEGER PORTABLE POWER CORPORATION, OF DETROIT, MICHIGAN, A CORPORATION OF MICHIGAN.

SUPPORTING DEVICE FOR VEHICLE ATTACHMENTS.

Application filed November 9, 1925. Serial No. 67,985.

This invention relates generally to devices for supporting attachments of various kinds upon vehicles and the like, and consists of certain novel features of construction, combinations and arrangements of parts as will be more fully pointed out in the appended claims.

In the accompanying drawings:

Figure 1 is a front elevation of a vehicle with supporting device embodying my invention applied thereto.

Figure 2 is a side elevation of one of the supporting devices with a bumper arm attached thereto.

Figure 3 is a top plan view of one of the supporting devices.

Figure 4 is a front elevation of one of the supporting devices.

Figure 5 is a fragmentary front elevation of a vehicle with a slightly modified form of supporting device applied thereto.

Figure 6 is a fragmentary top plan view of a vehicle with the construction shown in Figure 5 applied thereto.

Figure 7 is a detail perspective view of one of the supporting devices.

Referring now to the drawings, the numeral 1 designates a motor vehicle having the usual chassis sills 2 from which the front body fenders 3 are preferably supported by means of the channel-shaped braces 4.

In order that attachments of various kinds may be supported at the forward end of the vehicle, I preferably provide a pair of blocks 5 which are anchored, one on each side of the vehicle. As shown, each block has a base portion 6 and a lateral portion 7. Each base portion 6 rests upon a sill member 2 at the forward end thereof and is recessed as shown at 8 to receive the usual radiator bolt 9, while each lateral portion 7 rests on a fender 3 and is recessed as shown at 10 to receive a securing bolt 11. To provide a strong and durable connection, each bolt 11 passes through a fender 3 and the base of a channel brace 4 and is held in position by means of a suitable nut 12. Moreover each lateral portion 7 projects at its inner edge slightly below the adjacent base portion 6, hence a suitable longitudinally extending shoulder 13 is provided on the lower face of each block for engagement with the adjacent outer face of a sill member 2. To strengthen the construction further, the base portion 6 of each block is preferably provided at its forward end with a depending lug or flange 14 that abuts the forward end of the adjacent sill member 2 for taking up thrust and the like to which the blocks may be subjected. Thus, with this construction, a single bolt 11 will suffice to hold a block in position.

The blocks shown in Figures 1 to 4 inclusive are preferably designed to support a suitable spring bumper at the forward end of the vehicle, hence the base portions 6 are each provided with the upstanding longitudinally extending bifurcated portions 15 for receiving the usual rearwardly extending arms 16 of the bumper. Any suitable means such as the bolts 17 extending transversely of the furcations 15 may be used to hold these arms 16 in position.

In Figures 5 to 7 inclusive, I have shown a slight modification in which the blocks 20 are preferably designed to support a special frame (not shown) upon which a portable woodworking machine water pump and the like may be mounted and driven from the power shaft of the vehicle engine. With this construction each block 20 has a base portion 21 and a depressed lateral portion 22 and is held in position on the adjacent sill member 2 by a single bolt 23 which passes through the adjacent fender 24 and channel brace 25, however the lateral portion 22 is preferably V-shape in cross section and is provided at its opposite ends with the vertical webs 26 that connect into the side walls of each V. Inasmuch as this V-shape lateral portion 22 is depressed with respect to the base portion 21, the inner wall 27 of each portion 22 constitutes a longitudinally extending shoulder or abutment for engagement with the adjacent outer face of a sill member 2. Moreover the base portion 21 of each block has at its forward end a depending lug or flange 28 which extends transversely of the block from the inner edge of the base 21 to the adjacent web 26 and abuts the forward end of the adjacent sill member to take up thrust, etc. With this construction the webs 26 of each block are preferably provided with aligned openings 29 which receive suitable eye-bolts 30 for holding the tie rods or straps (not shown) of the special frame referred to. If desired, angle braces 31 may be used to supplement the bolts 23 for anchoring the blocks 20 on the sill members 2. As shown, the short webs 32 of the angle braces 31 are preferably apertured to receive the eye-bolts 30 at the rear ends of the blocks, while the long webs 33 of the braces are apertured to receive suitable securing elements such as the bolts 34 which are preferably secured to the adjacent sill members 2. Hence a very strong and durable construction is provided.

While it is believed that from the foregoing description, the nature and advantage of my invention will be readily apparent, I desire to have it understood that I do not limit myself to what is herein shown and described and that such changes may be resorted to when desired as fall within the scope of what is claimed.

What I claim as my invention is:

1. The combination with a vehicle having a sill member, a brace projecting from said member, and a fender carried by said brace, of a support for attachments including a block on the sill member secured to said brace and carrying means for holding an attachment.

2. The combination with a vehicle having a sill member, a brace projecting from said member, and a fender carried by said brace, of a support for attachments including a block having a body portion and a lateral portion, the body portion resting on a sill member and being recessed to receive a radiator bolt of the vehicle, the lateral portion resting on said fender, and means securing said lateral portion to said brace.

3. The combination with a vehicle having a sill member, and a fender brace projecting therefrom, of a supporting device for attachments including a block resting on the sill member carrying means for holding an attachment, and means for securing the block on the sill member including an element extending through the brace.

4. A block of the class described having a body portion recessed to receive a radiator bolt, and a lateral portion for overlapping a body fender having an aperture for receiving a securing element.

5. A block of the class described having a body portion for engagement with a sill member, a lateral portion for engagement with a body fender, said lateral portion projecting below the body portion providing a shoulder for engagement with the sill member aforesaid.

6. A block of the class described having a body portion, and a lateral attaching portion, one of said portions having a depending lug for abutting a part of a vehicle to take up thrust to which the block may be subjected.

7. A block of the class described having a body portion recessed to receive a radiator bolt, a lateral attaching portion apertured to receive a securing element, and a depending lug at an end of one of said portions engageable with a sill member to take up thrust to which the block may be subjected.

8. A block of the class described having a body portion, and a substantially V-shaped lateral attaching portion provided with spaced webs having apertures for receiving an eye-bolt and the like to which a frame tie rod may be connected.

9. A block of the class described having a body portion, a depending lug at one end of the body portion, and a laterally extending portion having spaced webs apertured to receive an eye-bolt and the like.

10. In combination, a block of the class described having a body portion adapted to seat upon a sill member, a lateral attaching portion recessed to receive a securing element and having spaced webs provided with apertures, a bolt engaging said apertures and having a portion for holding a frame tie rod and the like, and a brace carried by said eye-bolt apertured for receiving a securing element engageable with the sill member aforesaid.

11. In combination, a block of the class described having a body portion adapted to seat upon a sill member, a lateral attaching portion having spaced webs provided with apertures, and a bolt engaging said apertures and having a portion for holding a frame tie rod and the like.

12. A block of the class described having a body portion recessed to receive a radiator bolt, and a depending lug for engagement with a part of a vehicle to take up thrust to which the block may be subjected.

13. A block of the class described, comprising a body portion adapted to seat upon a chassis sill, a depending lug at one end of the body portion engageable with an end of said sill to take up thrust to which the block may be subjected, and means carried by the block for holding vehicle attachment tie members and the like.

In testimony whereof I affix my signature.

ROY E. WING.